(12) United States Patent
Pollock et al.

(10) Patent No.: US 8,514,996 B2
(45) Date of Patent: Aug. 20, 2013

(54) REAL TIME DISTRIBUTED EMBEDDED OSCILLATOR OPERATING FREQUENCY MONITORING

(75) Inventors: Julie Pollock, Clearwater, FL (US);
Brett D. Oliver, Tampa, FL (US);
Christopher Brickner, St. Petersburg, FL (US)

(73) Assignee: Honeywell International Inc., Morristown, NJ (US)

( * ) Notice: Subject to any disclaimer, the term of this patent is extended or adjusted under 35 U.S.C. 154(b) by 413 days.

(21) Appl. No.: 12/835,928

(22) Filed: Jul. 14, 2010

(65) Prior Publication Data
US 2012/0014490 A1    Jan. 19, 2012

(51) Int. Cl.
*H04L 7/00* (2006.01)
(52) U.S. Cl.
USPC ............................................. 375/371

(58) Field of Classification Search
USPC .................................. 375/371, 354, 356, 362
See application file for complete search history.

(56) References Cited

U.S. PATENT DOCUMENTS

| | | | |
|---|---|---|---|
| 5,206,857 A | 4/1993 | Farleigh | |
| 5,544,324 A * | 8/1996 | Edem et al. | 709/231 |
| 6,028,855 A * | 2/2000 | Hirsch | 370/350 |
| 6,362,693 B2 * | 3/2002 | Unterricker | 331/11 |
| 7,362,767 B2 | 4/2008 | Orberk et al. | |
| 2009/0228732 A1* | 9/2009 | Budde et al. | 713/400 |

* cited by examiner

*Primary Examiner* — Kevin Kim
(74) *Attorney, Agent, or Firm* — Fogg & Powers LLC

(57) ABSTRACT

A method for clock monitoring in a network is provided. The method comprises receiving a first network clock signal at a network device and comparing the first network clock signal to a local clock signal from a primary oscillator coupled to the network device.

17 Claims, 6 Drawing Sheets

REAL TIME DISTRIBUTED EMBEDDED OSCILLATOR OPERATING FREQUENCY MONITORING

STATEMENT REGARDING FEDERALLY SPONSORED RESEARCH OR DEVELOPMENT

This invention was made with Government support under NNJ06TA25C awarded by National Aeronautic and Space Administration (NASA). The Government has certain rights in the invention.

BACKGROUND

An operating frequency of an electronic device is often provided by a local clock or oscillator. The clock is monitored via monitoring requirements for accuracy, failure, or total loss. These monitoring requirements assure the accuracy of time values and provide improved fault protection. Typically, each device has at least two oscillators, a primary oscillator for clocking the device and a secondary oscillator for clock monitoring. The primary oscillator is monitored by comparing it to the secondary oscillator to determine if the clock requirements are met. However, having more than one local oscillator increases the size, weight, power consumption, and cost of the device.

SUMMARY

Some embodiments described herein provide a method for clock monitoring in a network. One embodiment of the method comprises receiving a first network clock signal at a network device and comparing the first network clock signal to a local clock signal from a primary oscillator coupled to the network device.

DRAWINGS

Features of the present invention will become apparent to those skilled in the art from the following description with reference to the drawings. Understanding that the drawings depict only typical embodiments and are therefore not to be considered limiting in scope, the invention will be described with additional specificity and detail through the use of the accompanying drawings, in which.

Like reference numbers and designations in the various drawings indicate like elements.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

Some embodiments described herein provide clock monitoring for a network device with a single local oscillator. The device extracts an embedded clock signal from a data signal received at an interface of the device. This extracted clock signal is compared to a local oscillator on the device. When the frequencies of the extracted clock signal and local oscillator are more than a predetermined threshold value apart, a failure is indicated. In other embodiments, the device receives a plurality of embedded clock signals to compare to the local oscillator. In such embodiments, faults are isolated when there are at least two non-faulting oscillators.

Figure 1:
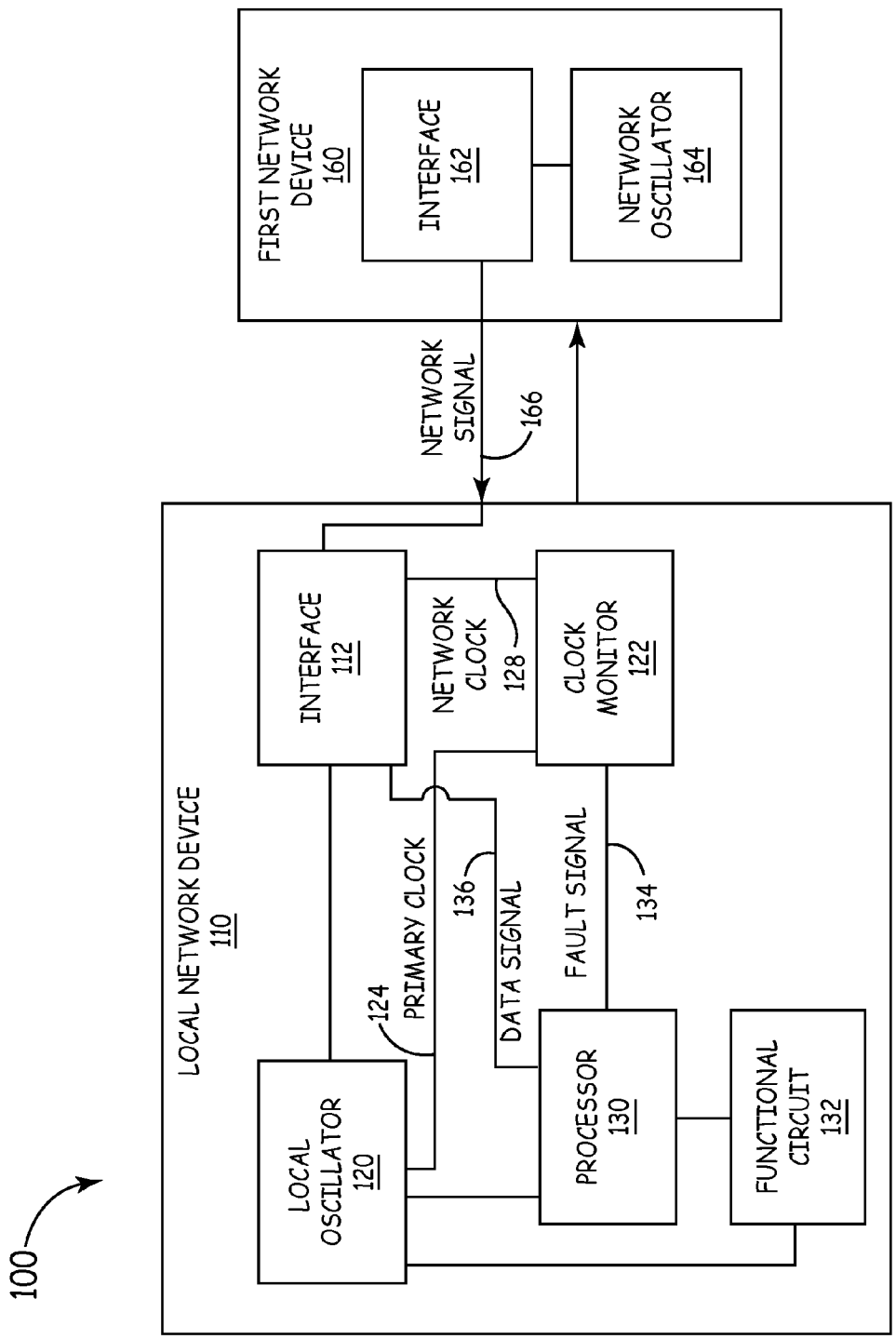
FIG. 1 is block diagram of one embodiment of a system having clock monitoring.

FIG. 1 is block diagram of one embodiment of a system 100 having clock monitoring. The system 100 comprises a local network device 110 coupled to a first network device 160 through interfaces 112 and 162, respectively. An oscillator 164 provides the first network device 160 with a clock signal. The first network device 160 embeds the clock signal with a data signal into a network signal 166 and transmits the network signal 166 to the local network device 110. In one embodiment, the system 100 is a network system, including, but not limited to, a network within a computer, an Ethernet network, a RapidIO network, or any network with a data link between two or more devices sending signals with embedded clocks of a specified tolerance (for example, 50 MHz±10%).

The local network device 110 comprises a local oscillator 120, a clock monitor 122, a processor 130, and a functional circuit 132. The local network device 110 is any electronic device, such as a computer, a device for use in the space and aircraft industries, a high speed data device, cell phone, navigation device, a multi-port device, and the like. In other embodiments, the local network device 110 is a single port or multi-port switch. In implementations of the local network device 110 as a switch, the local network device 110 is configured to couple to a processor 130 or functional circuit 132 external to the local network device 110. The functional circuit 132 can include any type or number of components, such as but not limited to processors, memories, registers, etc., that provide the functions of the local network device 110. In one embodiment of the local network device 110, the processor 130 is part of the functional circuit 132. Embodiments of the first network device 160 can include any of the foregoing embodiments of the local network device 110.

One embodiment of the system 100 employs high-speed data links which embed clock and data together for better data recovery with a source synchronous transfer. In a source synchronous transfer, each network device 110 and 160 transmits data with an embedded clock using its local oscillator and recovers the data being received by a remote transmitting device using the embedded recovered clock.

The interface 112 extracts the embedded clock signal (referred to as network clock 128) from the network signal 166. The network clock 128 is provided to the clock monitor 122. The interface 112 provides the processor 130 with a data signal 136 from the network signal 166. In another embodiment, the network signal 166 is provided to the functional circuit 132. In another embodiment, the clock monitor 122 extracts the network clock 128 from the network signal 166.

The local oscillator 120 provides the primary clock signal 124 to at least the processor 130, functional circuit 132, and clock monitor 122. The primary clock signal 124 provides an operating frequency for the network device 110. In one embodiment, the network device 110 has a predetermined tolerance requirement for the accuracy of the local oscillator 120. In some embodiments, the tolerance of the local oscillator 120 approximately matches that of network clock 128 embedded in the network signal 166. That is, a data link tolerance approximately matches, or is within a predetermined threshold range of, a monitor tolerance for the network device 110.

The clock monitor 122 monitors the local oscillator 120 to ensure the frequency of the local oscillator 120 is within the predetermined tolerance. The clock monitor 122 compares the primary clock 124 with the network clock 128. When the frequencies of the primary clock 124 and the network clock 128 differ by more than a predetermined threshold value, an error indication or fault signal is generated. In one embodiment, the predetermined threshold value is the predetermined tolerance. In another embodiment, the clock monitor issues a fault signal 134 when the difference between the primary clock 124 and the network clock 128 exceeds the predetermined threshold value. In yet another embodiment, a fault indication is made when the predetermined threshold value is exceeded, for example, powering down the local network device 110, issuing an auditory or visual warning, or the like.

Figure 2A:
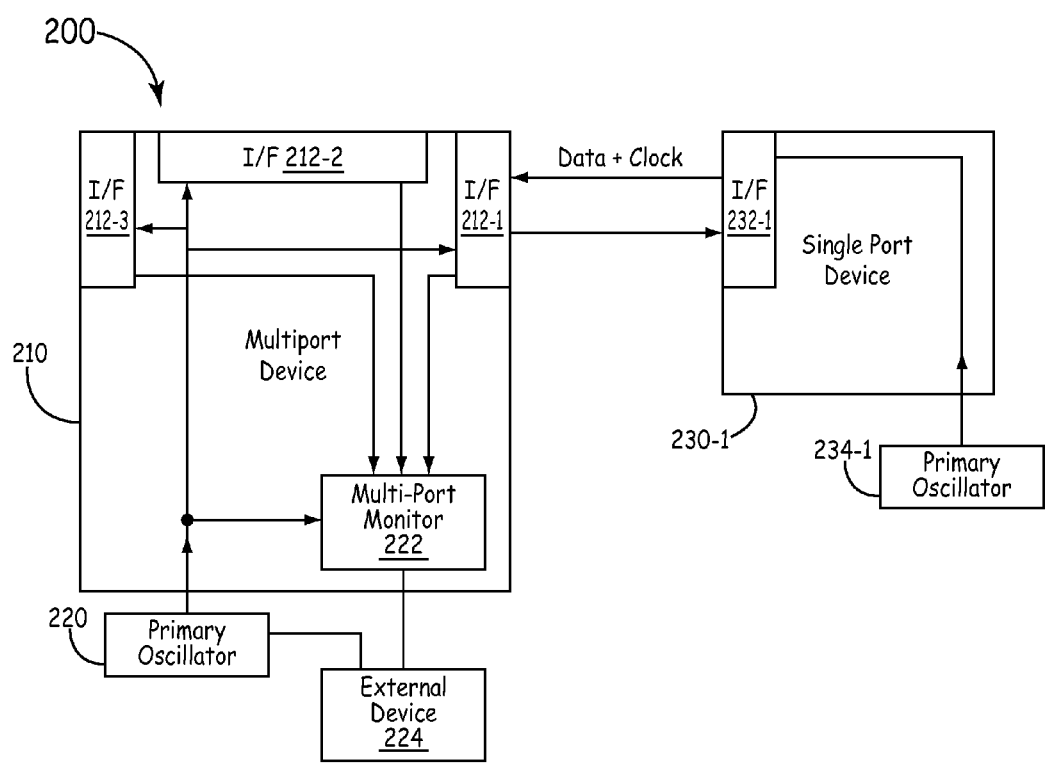
FIGS. 2A and 2B are block diagrams of embodiments of a network comprising a multi-port device with clock monitoring.
Figure 2B:
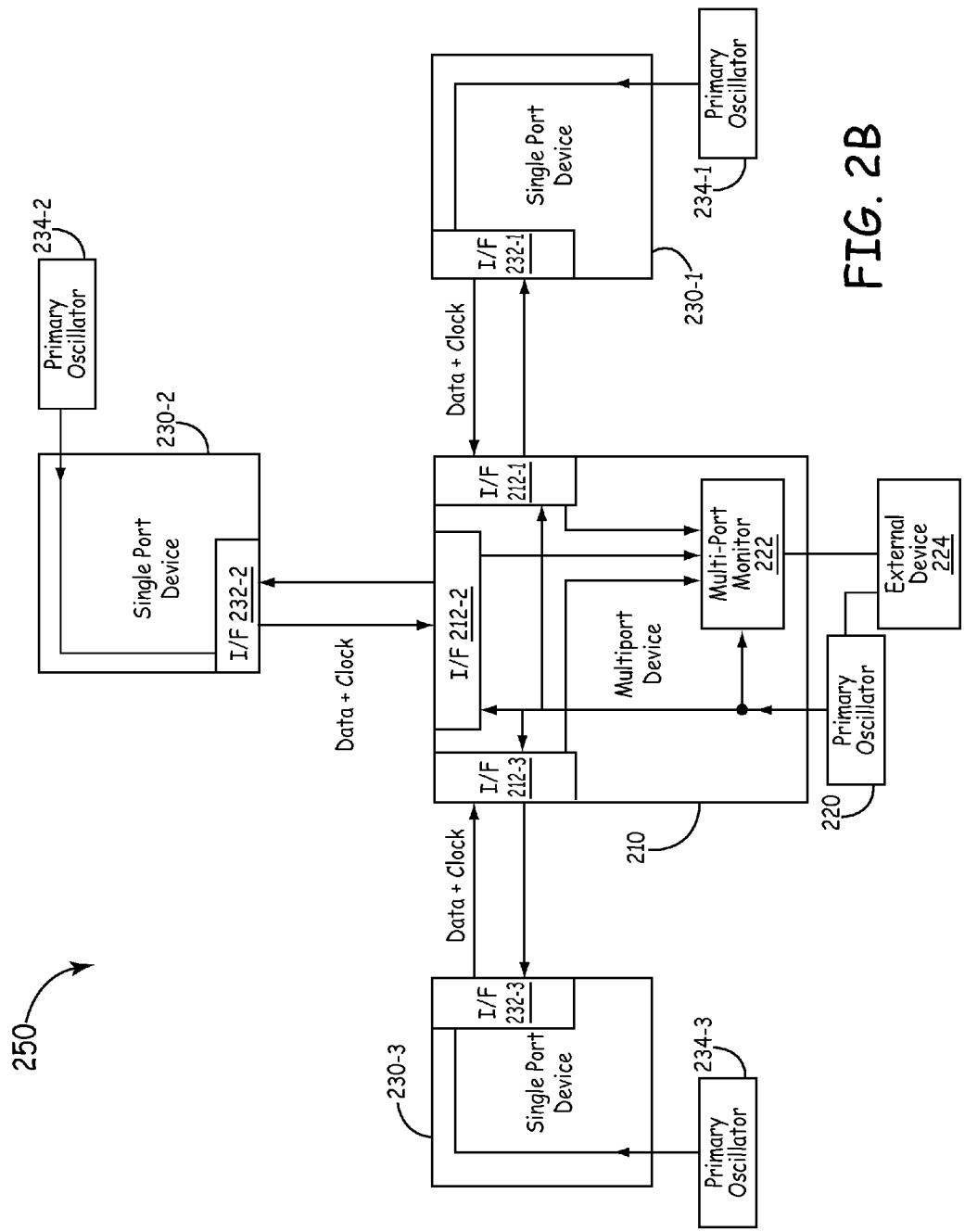

FIGS. 2A and 2B are block diagrams of embodiments of a network comprising a multi-port device with clock monitoring. FIG. 2A illustrates a network 200 having a multi-port device 210 with clock monitoring coupled to a single port device 230-1. The multi-port device 210 comprises a multi-port monitor 222 and interfaces 212-1, 212-2, and 212-3. Coupled to the multi-port device 210 is a primary oscillator 220 that provides clocking for the multi-port device 210 and an external device 224 coupled to the multi-port device 210. In one embodiment, the multi-port device 210 is on the same chip as the external device 224.

The single port device 230-1 and multi-port device communicate via interface 232 and interface 212-1, respectively. A primary oscillator 234-1 provides the single port device 230-1 with a clock signal to embed with a data signal for source synchronous transfer to the multi-port device 210. The multi-port monitor 222 extracts the embedded clock signal from the network signal and compares it with the primary oscillator 220. When the frequencies of the primary oscillators 220 and 234-1 differ by more than a predetermined threshold value, the multi-port monitor 222 issues a failure signal to the external device 224.

FIG. 2B illustrates a network 250 with three data links between a multi-port device 210 and each of three single port devices 230-1, 230-2, and 230-3. Multi-port device 210 has the same components as described above with respect to FIG. 2A. The three single port devices 230-1, 230-2, and 230-3 are each coupled to a primary oscillator 234-1, 234-2, and 234-3, respectively. In this embodiment, the multi-port monitor 222 receives clock signals from the single port devices 230-1, 230-2, and 230-3 from primary oscillators 234-1, 234-2, and 234-3, respectively. In one embodiment, the multi-port monitor 222 compares the primary oscillator 220 against each of the primary oscillators 234-1 through 234-3. In one implementation, the multi-port monitor 222 issues a failure warning if the frequency of the primary oscillator 220 differs from the frequency of one of the primary oscillators 234-1 through 234-3 by a predetermined threshold amount.

In single fault situations, the multi-port monitor 222 isolates a detected fault by comparing the outcomes of the comparisons of the primary oscillator 220 with each primary oscillators 234-1 through 234-3. A single fault is isolated when there are at least two data links providing an embedded clock to compare with the primary oscillator 220. Thus, fault tolerance and isolation is possible for a multi-port device 210 when the multi-port monitor 222 compares the clocks from 2n+1 data links, where n is the number of faulting clocks.

Figure 3A:
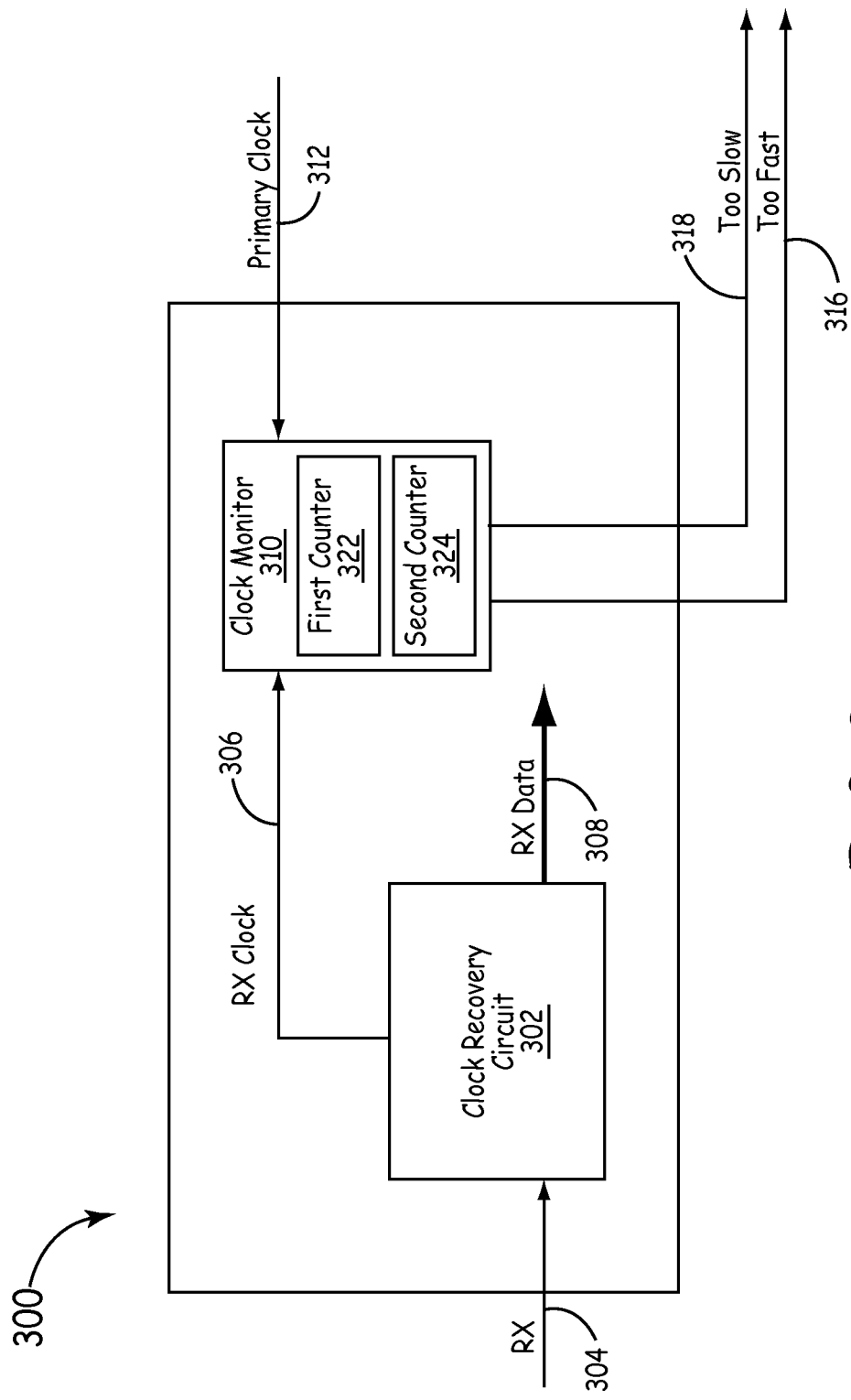
FIGS. 3A and 3B are block diagrams of alternative embodiment of a clock monitoring device.
Figure 3B:
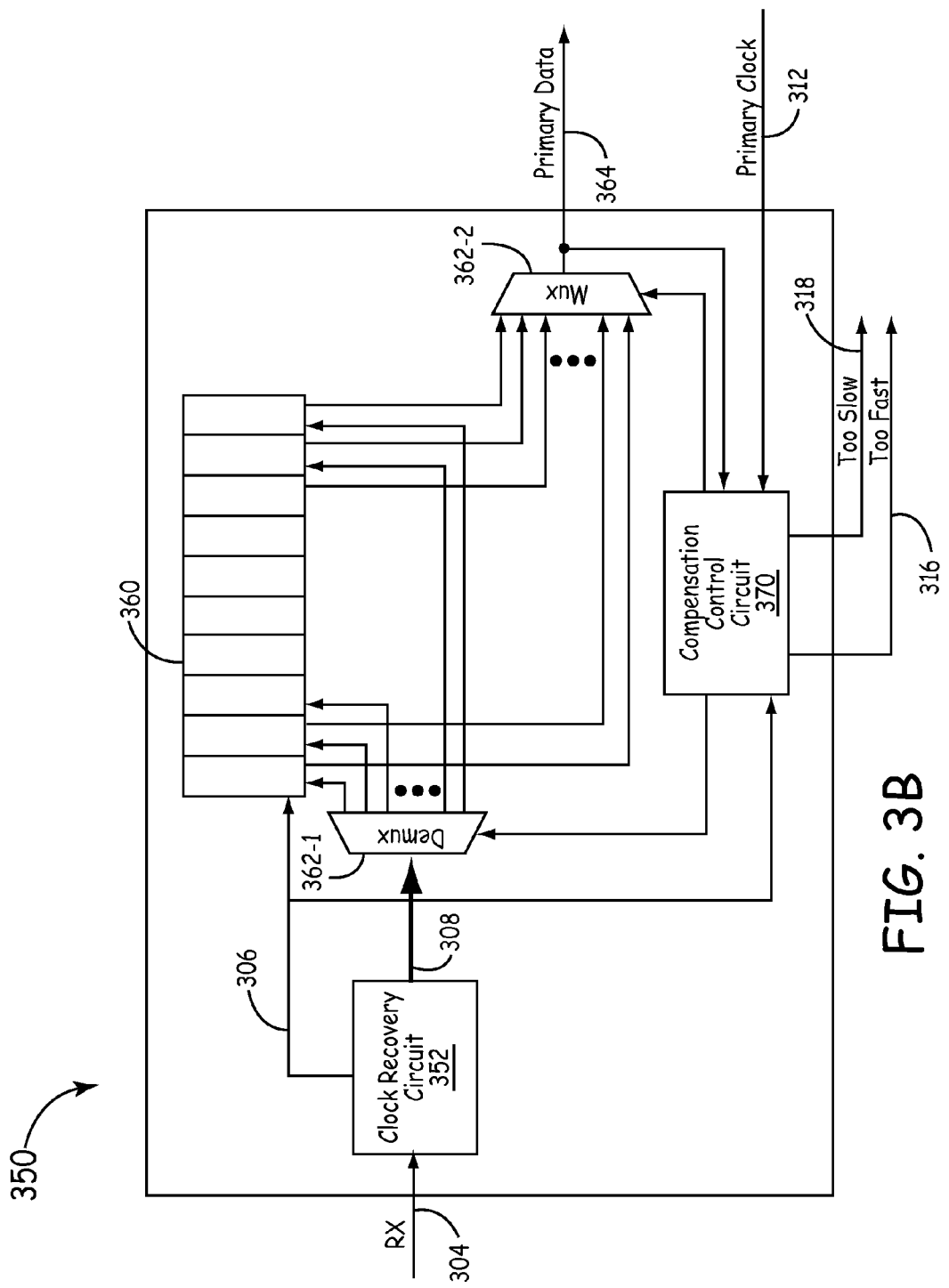

FIGS. 3A and 3B are block diagrams of alternative embodiments of a clock monitoring device. FIG. 3A illustrates an embodiment of a clock monitoring device 300 which can be used for a single port device or for a multi-port device. The clock monitoring device 300 comprises a clock recovery circuit 302 and a monitor 310. In another embodiment, the clock recovery circuit is part of an interface and not part of the clock monitoring device 300.

As shown in FIG. 3A, received signal 304 is transmitted to the clock recovery circuit 302 from a network device. A received clock signal 306 and a received data signal 308 are recovered from the received signal 304. The received data signal 308 is provided to another device coupled to the clock monitoring device 300.

The clock recovery circuit 302 provides the received clock signal 306 to the monitor 310. The monitor 310 compares the received clock signal 306 to a primary clock signal 312 coupled to the clock monitoring device 300. In one embodiment, the monitor 310 compares the count in the received clock counter 322 with the count in the primary clock counter 324. For example, the primary clock signal 312 can be from a primary oscillator in a multi-port device comprising the clock monitoring device 300. The monitor 310 comprises a first counter 322 for the primary clock domain and a second counter 324 for the received clock domain. The first counter 322 and the second counter 324 counts clock pulses from the primary clock signal 312 and the received clock signal 306, respectively. In one embodiment, if a primary clock is too fast, the count in the first counter 322 will be too high, and if the primary clock is too slow, the count in the first counter 322 would be too small for a specified time period. The first and second counters 322 and 324 are compared at predetermined intervals to ensure the maximum absolute difference between the counters is within a predetermined tolerance or threshold amount. Thus, the monitor 310 determines if the primary clock signal 312 is too fast or too slow compared with the received clock signal 306. The monitor 310 issues a too fast signal 316 if the primary clock signal 312 is faster than the received clock signal 306 and a too slow signal 318 if the primary clock signal 312 is slower, or vice versa.

FIG. 3B is a block diagram of an embodiment of a clock monitoring device 350 for a multi-port device. The clock monitoring device 350 comprises a clock recovery circuit 352, a buffer 360, a demultiplexer (demux) 362-1 and a multiplexer (mux) 362-2, and compensation control circuit 370. A received signal 304 is transmitted to the receiver over a data link from a transmitter. The clock recovery circuit 352 extracts a received clock signal 306 and a received data signal 308 from the received signal 304. The received clock signal 306 is provided to the buffer 360 and the compensation control circuit 370. The demux 362-1 receives the received data signal 308 at a first input, and outputs data symbols into the ring buffer 360. Likewise, data symbols stored in the ring buffer 360 are output to the mux 362-2, which outputs primary data signal 364. A primary clock signal 312 is provided to the compensation control circuit 370. In one embodiment, the clock monitoring device 350 is a clock monitor for a single-port device. Embodiments of the buffer 360 include a ring buffer or other type of buffer.

The clock compensation circuit 370 is configured to move data between the received clock domain and a local clock domain. That is, the clock compensation circuit 370 is configured to speed up or slow down the output of the received data signal 308 in order to match the data speed to the primary clock. In this embodiment, the buffer 360 has a fixed delay that is adjustable by removing or adding fill symbols of no value. If the receiver (for example, the network clock) has a faster flow rate than the transmitter (for example, the primary clock), a validated symbol may be dropped or duplicated. Therefore, a fill symbol is added or removed to prevent a faster or slower flow from the receiver with respect to the transmitter. In one embodiment, the primary data signal 364 is at least two symbols behind the received data signal 308.

The compensation control circuit 370 tracks how often a correction is made in order to monitor the primary clock signal 312. In one embodiment, the compensation control circuit 370 issues a too fast signal 316 or too slow signal 318 when more than a predetermined number of corrections are made during a predetermined time interval. In one embodiment, the absolute value of the difference between the number of symbols added and the number of symbols removed is compared to a predetermined threshold number of adjustments during a predetermined time period. In another embodiment, a too slow signal is outputted when a predetermined number of fill symbols have been added more than symbols (that is, previous fill symbols or data symbols) have been removed during a predetermined time interval. Likewise, a too fast signal is outputted when a predetermined number of symbols (fill or data symbols) have been removed more than fill symbols added during a predetermined time interval.

Embodiments of network devices having circuitry for recovery of valid data that indicates whether the primary clock is too fast or too slow with respect to a network clock, such as described with respect to FIG. 3B, enables clock monitoring with network links without adding additional hardware.

Figure 4:
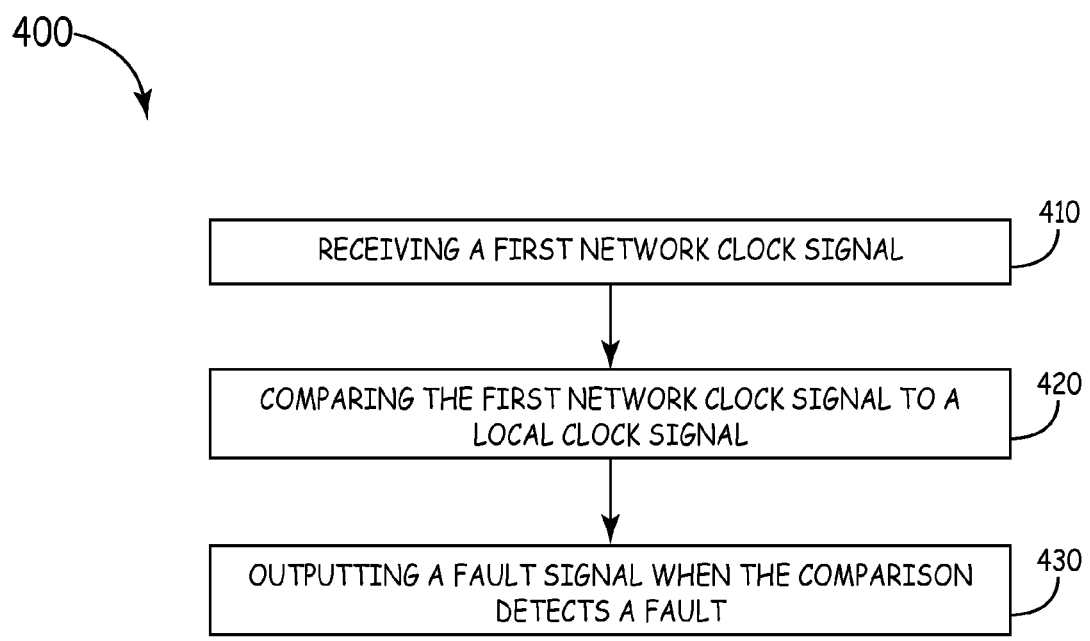
FIG. 4 is a flowchart of one embodiment of a method for clock monitoring of a local clock in a network.

FIG. 4 is a flowchart of one embodiment of a method 400 for clock monitoring of a local clock in a network. A first network clock signal is received at a first port of a local network device (block 410). In one embodiment, the port extracts the first network clock signal from a source synchronous data signal. The first network clock signal is compared to a local clock signal on the local network device (block 420). For example, in FIG. 1, the primary clock 124 of the local network device 110 is compared to the network clock 128 of the first network device 160.

As described above, implementations of the comparison of the local clock signal and the first network clock signal include comparing the signals using counters, comparing frequencies directly, determining an excess number of adjustments made to speed up or slow down data received from the first network device, or any other suitable method for comparing two oscillators. Once a comparison is made, a fault signal is outputted when the comparison detects a fault (block 430). A fault is detected based on whether the difference in frequencies between the clock signals exceeds a predetermined threshold value, on whether too many buffer adjustments were made in a specific time interval, or the like.

One embodiment of method 400 further comprises comparing a plurality of embedded network clocks to the local clock to isolate a fault. In another embodiment, a fault location indication is provided to at least the port coupled to the faulting oscillator.

Embodiments described herein utilize clocks embedded inside network data links as monitor clock sources. A local device determines if a local remote center is out of tolerance using only one data link. For network fabric components that have multiple links the fault tolerance is scaled to the number of active receiving links. A separate clocking source is not required as a monitor.

A computer or processor implementing the various embodiments described above can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include or function with software programs, firmware, or other computer readable instructions for carrying out various process tasks, calculations, and control functions used in the present method and system.

Embodiments of the methods described above can be implemented by computer executable instructions, such as program modules or components, which are executed by a processor. Generally, program modules include routines, programs, objects, data components, data structures, algorithms, and the like, which perform particular tasks or implement particular abstract data types.

Instructions for carrying out the various process tasks, calculations, and generation of other data used in the operation of the method and system of the invention can be implemented in software, firmware, or other computer readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable computer readable storage media may include, for example, non-volatile memory devices including semiconductor memory devices such as EPROM, EEPROM, or flash memory devices; magnetic disks such as internal hard disks or removable disks; magneto-optical disks; CDs, DVDs, or other optical storage disks; nonvolatile ROM, RAM, and other like media; or any other media that can be used to carry or store desired program code in the form of computer executable instructions or data structures.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method for clock monitoring in a network, comprising:
    receiving a first network clock signal at a network device;
    comparing the first network clock signal to a local clock signal from a primary oscillator coupled to the network device;
    receiving a second network clock signal at the network device; and
    comparing the second network clock signal to the local clock signal to determine when the second network clock signal and the local clock signal differ by more than a predetermined threshold value.

2. The method of claim 1, further comprising:
    providing a fault indication when the local clock signal and the first network clock signal differ by more than a predetermined threshold value.

3. The method of claim 2, wherein providing a fault indication further comprises:
    outputting a too fast signal when the local clock signal is faster than the first network clock signal; and
    outputting a too slow signal when the local clock signal is slower than the first network clock signal.

4. The method of claim 1, wherein comparing the first network clock signal to a local clock signal further comprises:
    comparing a first counter that counts the local clock signal to a second counter that counts the first network clock signal.

5. The method of claim 1, further comprising:
extracting the first network clock signal from a first network signal that embeds the first network clock signal with a first network data signal.

6. The method of claim 5, further comprising:
wherein comparing the first network clock signal to a local clock signal further comprises determining a number of adjustments made to adjust the first network data signal to the local clock signal; and
providing a fault indication when the number of adjustments exceeds a predetermined number of adjustments in a predetermined time interval.

7. The method of claim 6, wherein determining a number of adjustments further comprises determining the absolute value of the difference between the number of symbols added to a buffer and the number of symbols removed from the buffer.

8. The method of claim 1, further comprising:
isolating a fault by comparing an outcome of the comparison between the first network clock signal and the local clock signal to an outcome of the comparison between the second network clock signal and the local clock signal to isolate the fault;
issuing a fault location indication when the fault is isolated.

9. A computer program product, comprising:
a computer readable medium having instructions stored thereon executable by a processor to carry out the method of claim 1.

10. A network device, comprising:
a first interface for receiving a first network clock embedded with a first data signal;
a local oscillator that provides a primary clock for timing the network device; and
a clock monitor that compares the first network clock to the primary clock, wherein the clock monitor outputs a fault signal when the difference in frequencies between the first network clock and the primary clock exceeds a predetermined threshold value;
a second interface for receiving a second network clock embedded with a second data signal; and
wherein the clock monitor compares the second network clock to the primary clock, wherein the fault is isolated when only one of the first network clock or the second network clock differs in frequency from the primary clock by more than a predetermined threshold amount.

11. The network device of claim 10, wherein the clock monitor further comprises:
a first counter for counting the primary clock; and
a second counter for counting the first network clock;
wherein the clock monitor outputs the fault signal when the count for the first counter differs from the count for the second counter by more than a predetermined threshold amount.

12. The network device of claim 10, wherein the clock monitor further comprises:
a clock recovery circuit that extracts the first network clock from the first data signal;
a ring buffer for storing data symbols from the first data signal;
a compensation control circuit coupled to the ring buffer, wherein the compensation control circuit is configured to:
add a fill symbol to the ring buffer when the primary clock is faster than the first network clock;
remove a fill symbol or a data symbol when the primary clock is slower than the first network clock;
output a too slow signal when the clock monitor adds a predetermined number of fill symbols more than it has removed fill symbols or data symbols within a predetermined time interval; and
output a too fast signal when the clock monitor removes a predetermined number of fill symbols or data symbols more than it has added fill symbols within the predetermined time interval.

13. The network device of claim 10, further comprising:
a processor coupled to the local oscillator, wherein the processor is clocked by the local oscillator;
wherein the processor receives the fault signal when a fault is detected.

14. The network device of claim 10, further comprising:
a third interface for receiving a third network clock embedded with a third data signal;
wherein the clock monitor is further configured to:
compare the primary clock, the first network clock, the second network clock, and the third network clock together to determine the presence and location of a fault; and
when a fault is determined to be of one of the network clocks based on the comparison, output a fault indication to a port coupled to the faulted network clock.

15. A clock monitoring system, comprising:
a first network device having a first oscillator that provides a first clock for timing the first network device;
a local network device coupled to the first network device, wherein the local network device comprises:
a first interface coupled to the first network device, wherein the first interface extracts the first clock from a first received signal transmitted to the first interface by the first network device;
a local oscillator that provides a local clock for the local network device; and
a clock monitor that compares the local clock to the first clock and outputs a fault indication when the local clock and the first clock differ in frequency by more than a predetermined threshold value, wherein the clock monitor comprises:
a ring buffer for temporarily storing data symbols from the first received signal; and
a compensation control circuit coupled to the ring buffer, wherein the compensation control circuit is configured to:
add a fill symbol to the ring buffer when the local clock is faster than the first clock;
remove a fill symbol or a data symbol when the local clock is slower than the first clock;
output a too slow signal when the clock monitor adds a predetermined number of fill symbols more than it has removed fill symbols or data symbols within a predetermined time interval; and
output a too fast signal when the clock monitor removes a predetermined number of fill symbols or data symbols more than it has added fill symbols within a predetermined time interval.

16. The clock monitoring system of claim 15, further comprising:
a second network device having a second oscillator that provides a second clock for timing the second network device;
wherein the local network device further comprises a second interface coupled to the second network device, wherein the second interface extracts the second clock from a second received signal transmitted to the second interface by the second network device;
wherein the clock monitor is configured to:

compare the local clock to the second clock and output an indication when the local clock and the second clock differ in frequency by more than the predetermined threshold value; and output a failure location indication based on the comparisons between the local clock and the first and second clocks.

17. The clock monitoring system of claim 15, wherein the local network device and the first network device are part of a computer network.

* * * * *